(12) United States Patent
Yen

(10) Patent No.: US 8,242,751 B2
(45) Date of Patent: Aug. 14, 2012

(54) CHARGING DEVICE FOR ALKALINE BATTERY

(76) Inventor: Jen-Yen Yen, Puyan Township, Changhua County (TW)

( * ) Notice: Subject to any disclaimer, the term of this patent is extended or adjusted under 35 U.S.C. 154(b) by 296 days.

(21) Appl. No.: 12/824,268

(22) Filed: Jun. 28, 2010

(65) Prior Publication Data

US 2011/0316473 A1 Dec. 29, 2011

(51) Int. Cl.
*H01M 10/46* (2006.01)
(52) U.S. Cl. ..................................... 320/139
(58) Field of Classification Search .............. 320/107, 320/110, 112, 123, 125, 139, 145; 290/1 R, 290/16, 50, 53, 54
See application file for complete search history.

(56) References Cited

U.S. PATENT DOCUMENTS

2004/0195996 A1* 10/2004 Nishida .................. 320/103
2006/0192931 A1* 8/2006 Roberts et al. ............ 355/55
* cited by examiner

*Primary Examiner* — Edward Tso

(57) ABSTRACT

A charging device includes a hand-operated generating circuit, a steady-state voltage circuit electrically connected with the hand-operated generating circuit, a pulse charging circuit electrically connected with the steady-state voltage circuit, a voltage detection circuit electrically connected with the pulse charging circuit, a discharging voltage limiting circuit electrically connected with the pulse charging circuit, a load circuit electrically connected with the discharging voltage limiting circuit and a charging selection circuit electrically connected between the steady-state voltage circuit and the pulse charging circuit. Thus, the charging device can be used to charge an alkaline battery or a common chargeable battery. In addition, the alkaline battery can be replaced when it fails without having to replace the charging device.

11 Claims, 2 Drawing Sheets

CHARGING DEVICE FOR ALKALINE BATTERY

BACKGROUND OF THE INVENTION

1. Field of the Invention

The present invention relates to a charging device and, more particularly, to a charging device that has a hand-operated generating function for charging an alkaline battery.

2. Description of the Related Art

A conventional charging device comprises a chargeable battery and a hand-operated generating circuit electrically connected with the chargeable battery to charge the chargeable battery. The chargeable battery is a common battery, such as a lithium or nickel battery. However, the conventional charging device cannot be used to charge an alkaline battery. In addition, the chargeable battery easily fails when it is not charged during a long period of time. Further, the chargeable battery easily causes an environmental pollution.

BRIEF SUMMARY OF THE INVENTION

In accordance with the present invention, there is provided a charging device, comprising a hand-operated generating circuit, a steady-state voltage circuit electrically connected with the hand-operated generating circuit, a pulse charging circuit electrically connected with the steady-state voltage circuit, a voltage detection circuit electrically connected with the pulse charging circuit, a discharging voltage limiting circuit electrically connected with the pulse charging circuit, and a load circuit electrically connected with the discharging voltage limiting circuit. The charging device further comprises a charging selection circuit electrically connected between the steady-state voltage circuit and the pulse charging circuit.

The primary objective of the present invention is to provide a charging device that can be used to charge an alkaline battery.

According to the primary advantage of the present invention, the charging device can be used to charge an alkaline battery or a common chargeable battery, thereby enhancing the versatility of the charging device.

According to another advantage of the present invention, the charging device can be used to charge an alkaline battery so that the alkaline battery can replace a common chargeable battery.

According to a further advantage of the present invention, the alkaline battery can be replaced when it fails without having to replace the charging device, thereby saving the cost.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
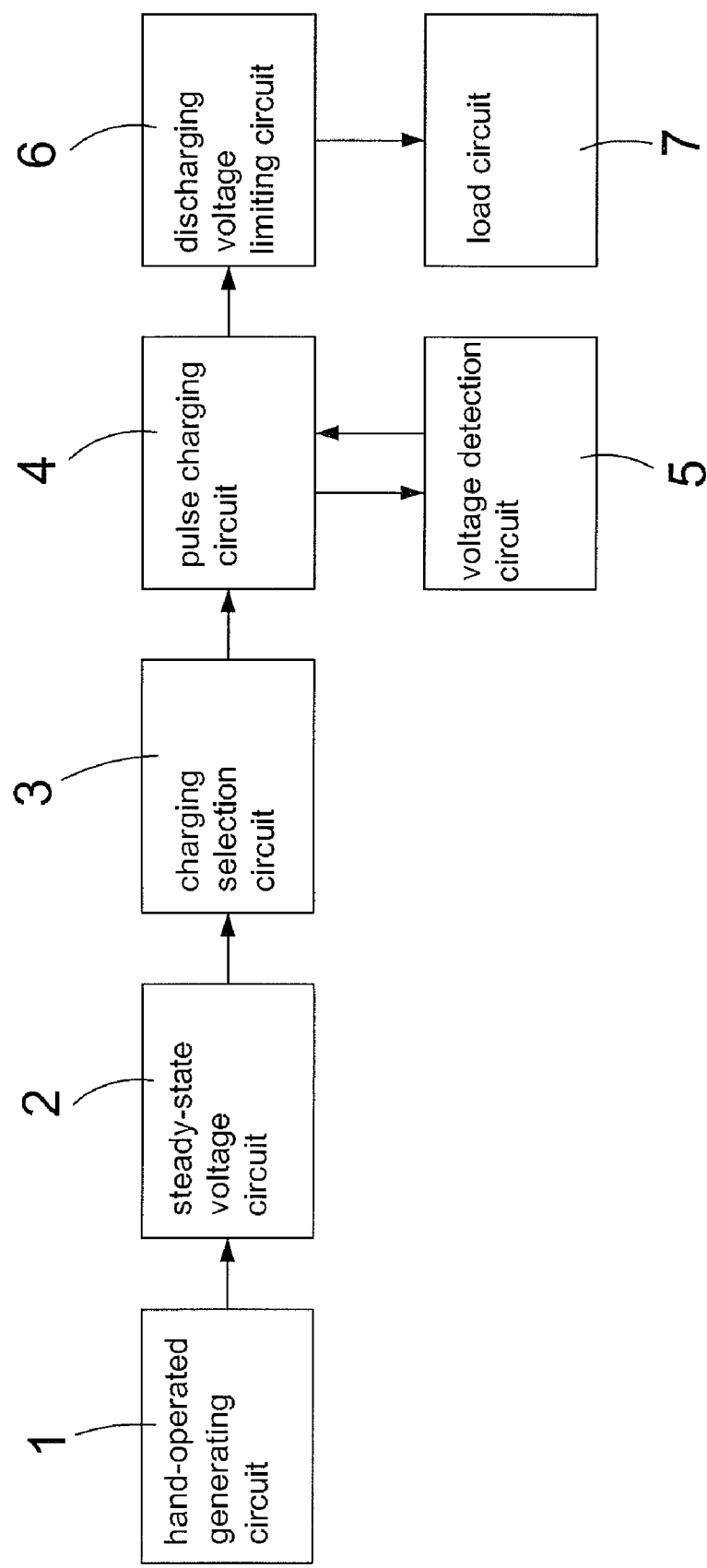
FIG. 1 is a block diagram of a charging device in accordance with the preferred embodiment of the present invention.
Figure 2:
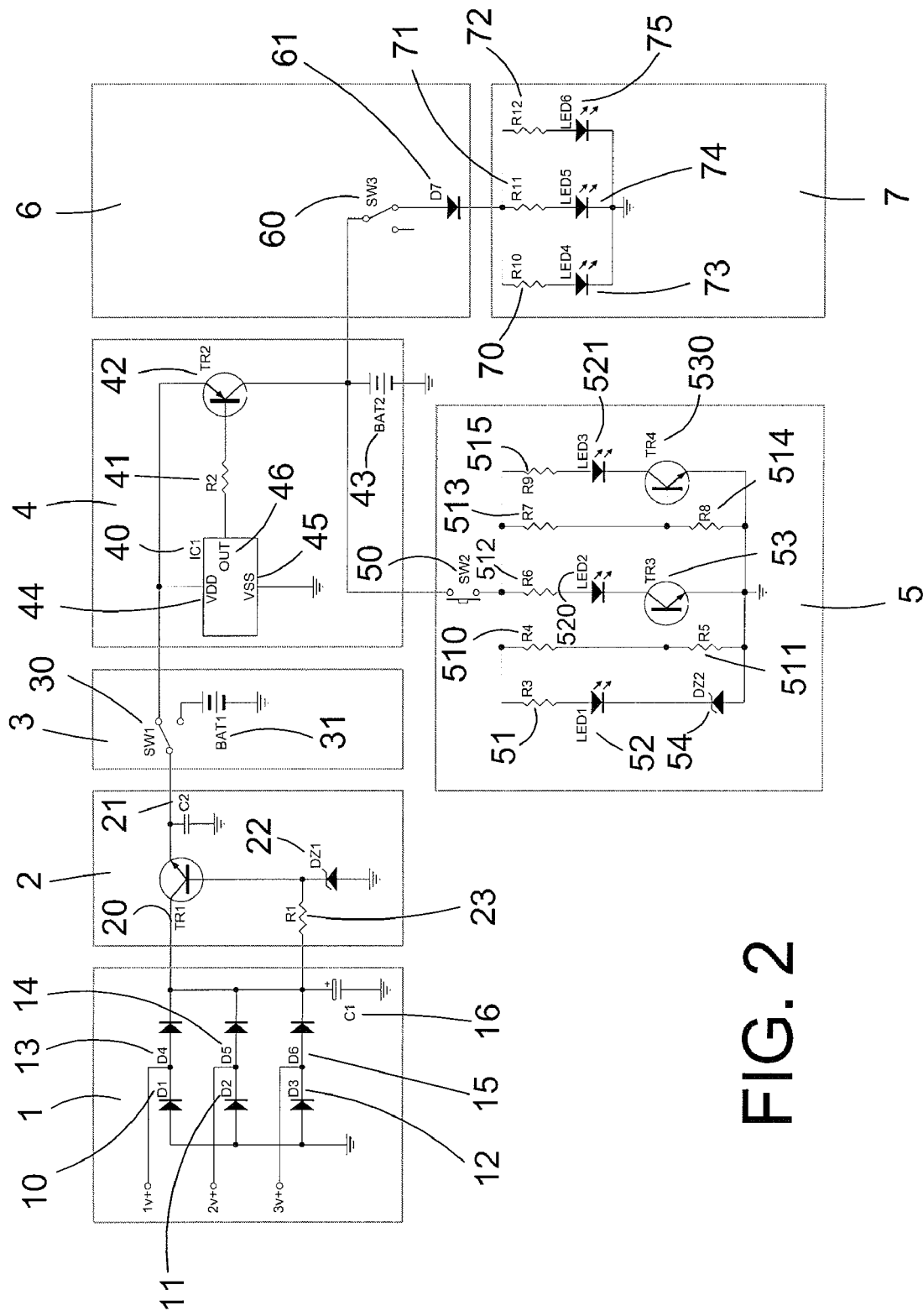
FIG. 2 is a circuit layout of the charging device as shown in FIG. 1.

Referring to FIGS. 1 and 2, a charging device in accordance with the preferred embodiment of the present invention comprises a hand-operated generating circuit 1, a steady-state voltage circuit 2 electrically connected with the hand-operated generating circuit 1, a pulse charging circuit 4 electrically connected with the steady-state voltage circuit 2, a voltage detection circuit 5 electrically connected with the pulse charging circuit 4, a discharging voltage limiting circuit 6 electrically connected with the pulse charging circuit 4, and a load circuit 7 electrically connected with the discharging voltage limiting circuit 6.

The hand-operated generating circuit 1 is electrically connected with a hand-operated three-phase generator (not shown) to convert an alternating current from the hand-operated three-phase generator to a direct current. The hand-operated generating circuit 1 includes a first diode 10, a second diode 11, a third diode 12, a fourth diode 13, a fifth diode 14, a sixth diode 15 and a first capacitor 16. The first diode 10, the second diode 11, the third diode 12, the fourth diode 13, the fifth diode 14, the sixth diode 15 of the hand-operated generating circuit 1 provide a rectifying function to convert an alternating current to a direct current. The first capacitor 16 of the hand-operated generating circuit 1 is a filtering capacitor that can provide a filtering function to reduce ripple waves in the direct current. Thus, when the hand-operated three-phase generator is operated to generate an electric power, the hand-operated generating circuit 1 is used to convert an alternating current from the hand-operated three-phase generator to a direct current.

The steady-state voltage circuit 2 is used to keep a voltage of the hand-operated generating circuit 1 at a steady state to protect a charged battery and to prevent the charged battery from producing overcharge. The steady-state voltage circuit 2 includes a first transistor 20, a second capacitor 21, a first zener diode 22 and a first resistor 23. The first zener diode 22 of the steady-state voltage circuit 2 provides a stabilizing function to stabilize the voltage of the base of the transistor 20 and to control the output voltage of the transistor 20 so as to protect a charged battery and to prevent the charged battery from producing overcharge.

The pulse charging circuit 4 includes an integrated circuit 40, a second resistor 41, a second transistor 42 and an alkaline battery 43. The integrated circuit 40 includes a power positive pole 44, a power negative pole 45 and an output 46. The integrated circuit 40 is used to convert the direct current into a pulse current which is used to charge the alkaline battery 43. The integrated circuit 40 is a pulse generator that can produce a pulse signal to charge the alkaline battery 43. It is to be noted that the pulse signal is a voltage or current that is varied instantaneously during a very short period of time. The pulse signal can be periodic or non-periodic.

The voltage detection circuit 5 includes a control switch 50, a third resistor 51, a fourth resistor 510, a fifth resistor 511, a sixth resistor 512, a seventh resistor 513, a eighth resistor 514, a ninth resistor 515, a first LED (light emitting diode) 52, a second LED 520, a third LED 521, a third transistor 53, a fourth transistor 530 and a second zener diode 54. The third transistor 53 and the fourth transistor 530 of the voltage detection circuit 5 are used to detect the voltage of the alkaline battery 43 so that the voltage detection circuit 5 can be used to check the discharging condition of the alkaline battery 43. Thus, when the charging capacity of the alkaline battery 43 fails, the alkaline battery 43 will not be charged by operation of the voltage detection circuit 5.

In the preferred embodiment of the present invention, the first LED 52 of the voltage detection circuit 5 is a green light, the second LED 520 of the voltage detection circuit 5 is a yellow light, and the third LED 521 of the voltage detection circuit 5 is a red light.

In practice, when the voltage of the alkaline battery 43 is greater than 4.5V, the first LED 52 of the voltage detection circuit 5 emits a green light to indicate that the alkaline battery 43 has a higher potential, when the voltage of the alkaline battery 43 is ranged between 3.2V and 4.5V, the second LED 520 of the voltage detection circuit 5 emits a yellow light to indicate that the alkaline battery 43 has a medium potential, and when the voltage of the alkaline battery 43 is ranged between 2.7V and 3.2V, the third LED 521 of the voltage detection circuit 5 emits a red light to indicate that the alkaline battery 43 has a lower potential. In such a manner, when the voltage of the alkaline battery 43 is greater than the range between 2.7V and 3.2V, the second zener diode 54 of the voltage detection circuit 5 is conducted, and the third LED 521 of the voltage detection circuit 5 lights. Alternatively, when the voltage of the alkaline battery 43 is at the range between 3.2±0.1V, the third LED 521 of the voltage detection circuit 5 blinks. Alternatively, when the voltage of the alkaline battery 43 is smaller than 2.7V, the second zener diode 54 of the voltage detection circuit 5 stops operating, and the third LED 521 of the voltage detection circuit 5 extinguishes to indicate that the alkaline battery 43 fails and cannot be charged any more.

The discharging voltage limiting circuit 6 includes an operation switch 60 and a seventh diode 61. The discharging voltage limiting circuit 6 co-operates with the voltage detection circuit 5 to limit the discharging voltage of the alkaline battery 43 so as to prevent from producing an over-discharge so that the alkaline battery 43 can be charged easily. It is to be noted that the alkaline battery 43 cannot be charged easily due to an excessive discharge. In practice, the eighth resistor 514 of the voltage detection circuit 5 is used to limit the discharging voltage of the alkaline battery 43, and the first LED 52, the second LED 520 and the third LED 521 of the voltage detection circuit 5 are used to indicate the discharging voltage of the alkaline battery 43. Thus, the voltage detection circuit 5 can be used to check the discharging condition of the alkaline battery 43 and can turn on/off the operation switch 60 of the discharging voltage limiting circuit 6 so as to limit the discharging voltage of the alkaline battery 43.

According to the experimental data, when the alkaline battery 43 is discharged to the potential of 1-1.2V, the alkaline battery 43 has the optimum charged effect. On the contrary, when the alkaline battery 43 is discharged to have a potential smaller than 1.0V, the alkaline battery 43 cannot be charged easily.

The load circuit 7 includes a tenth resistor 70, a eleventh resistor 71, a twelfth resistor 72, a fourth LED 73, a fifth LED 74 and a sixth LED 75. In the preferred embodiment of the present invention, the fourth LED 73, the fifth LED 74 and the sixth LED 75 of the load circuit 7 can function as LED lamps of a flashlight. In practice, the fourth LED 73, the fifth LED 74 and the sixth LED 75 of the load circuit 7 can light to indicate that the electric power of the alkaline battery 43 is exhausted and can blink or extinguish to indicate that the alkaline battery 43 fails to facilitate a user replacing the alkaline battery 43.

The charging device further comprises a charging selection circuit 3 electrically connected between the steady-state voltage circuit 2 and the pulse charging circuit 4. The charging selection circuit 3 includes a charging selection switch 30 and a chargeable battery 31, such as a lithium battery, a nickel battery and the like. The charging selection switch 30 has a first terminal connected with the steady-state voltage circuit 2 and a second terminal selectively connected with the chargeable battery 31 or the alkaline battery 43 so that the chargeable battery 31 or the alkaline battery 43 is selected to be charged by operation of the charging selection switch 30. At this time, the steady-state voltage circuit 2 is used to keep the voltage at a steady state to protect the chargeable battery 31 or the alkaline battery 43 during the charging process so as to prevent the chargeable battery 31 or the alkaline battery 43 from producing overcharge.

Accordingly, the charging device can be used to charge an alkaline battery or a common chargeable battery, thereby enhancing the versatility of the charging device. In addition, the charging device can be used to charge an alkaline battery so that the alkaline battery can replace a common chargeable battery. Further, the alkaline battery can be replaced when it fails without having to replace the charging device, thereby saving the cost.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A charging device, comprising:
   a hand-operated generating circuit;
   a steady-state voltage circuit electrically connected with the hand-operated generating circuit;
   a pulse charging circuit electrically connected with the steady-state voltage circuit;
   a voltage detection circuit electrically connected with the pulse charging circuit;
   a discharging voltage limiting circuit electrically connected with the pulse charging circuit; and
   a load circuit electrically connected with the discharging voltage limiting circuit.

2. The charging device of claim 1, wherein
   the hand-operated generating circuit is electrically connected with a hand-operated three-phase generator to convert an alternating current from the hand-operated three-phase generator to a direct current;
   the hand-operated generating circuit includes a first diode, a second diode, a third diode, a fourth diode, a fifth diode, a sixth diode and a first capacitor;
   the steady-state voltage circuit is used to keep a voltage of the hand-operated generating circuit at a steady state to protect a charged battery and to prevent the charged battery from producing overcharge;
   the steady-state voltage circuit includes a first transistor, a second capacitor, a first zener diode and a first resistor;
   the first zener diode of the steady-state voltage circuit provides a stabilizing function to stabilize the voltage of the base of the transistor and to control the output voltage of the transistor so as to protect a charged battery and to prevent the charged battery from producing overcharge;
   the pulse charging circuit includes an integrated circuit, a second resistor, a second transistor and an alkaline battery;
   the integrated circuit includes a power positive pole, a power negative pole and an output;
   the integrated circuit is used to convert the direct current into a pulse current which is used to charge the alkaline battery;
   the voltage detection circuit includes a control switch, a third resistor, a fourth resistor, a fifth resistor, a sixth resistor, a seventh resistor, a eighth resistor, a ninth resistor, a first LED (light emitting diode), a second LED, a third LED, a third transistor, a fourth transistor and a second zener diode;

the third transistor and the fourth transistor of the voltage detection circuit are used to detect the voltage of the alkaline battery so that the voltage detection circuit can be used to check the discharging condition of the alkaline battery;

when the charging capacity of the alkaline battery fails, the alkaline battery is charged by operation of the voltage detection circuit;

the discharging voltage limiting circuit includes an operation switch and a seventh diode;

the discharging voltage limiting circuit co-operates with the voltage detection circuit to limit the discharging voltage of the alkaline battery.

3. The charging device of claim 2, wherein the first LED, the second LED and the third LED of the voltage detection circuit have different colors to indicate different voltages of the alkaline battery.

4. The charging device of claim 3, wherein
the first LED of the voltage detection circuit is a green light;
the second LED of the voltage detection circuit is a yellow light; and
the third LED of the voltage detection circuit is a red light.

5. The charging device of claim 4, wherein
when the voltage of the alkaline battery is greater than 4.5V, the first LED of the voltage detection circuit emits a green light to indicate that the alkaline battery has a higher potential;
when the voltage of the alkaline battery is ranged between 3.2V and 4.5V, the second LED of the voltage detection circuit emits a yellow light to indicate that the alkaline battery has a medium potential;
when the voltage of the alkaline battery is ranged between 2.7V and 3.2V, the third LED of the voltage detection circuit emits a red light to indicate that the alkaline battery has a lower potential;
when the voltage of the alkaline battery is greater than the range between 2.7V and 3.2V the second zener diode of the voltage detection circuit is conducted, and the third LED of the voltage detection circuit lights;
when the voltage of the alkaline battery is at the range between 3.2±0.1V, the third LED of the voltage detection circuit blinks;
when the voltage of the alkaline battery is smaller than 2.7V, the second zener diode of the voltage detection circuit stops operating, and the third LED of the voltage detection circuit extinguishes to indicate that the alkaline battery fails and cannot be charged any more.

6. The charging device of claim 2, wherein
the eighth resistor of the voltage detection circuit is used to limit the discharging voltage of the alkaline battery;
the first LED, the second LED and the third LED of the voltage detection circuit are used to indicate the discharging voltage of the alkaline battery;
the voltage detection circuit can be used to check the discharging condition of the alkaline battery and can turn on/off the operation switch of the discharging voltage limiting circuit so as to limit the discharging voltage of the alkaline battery.

7. The charging device of claim 1, wherein the load circuit includes a tenth resistor, a eleventh resistor, a twelfth resistor, a fourth LED, a fifth LED and a sixth LED.

8. The charging device of claim 7, wherein the fourth LED, the fifth LED and the sixth LED of the load circuit can function as LED lamps of a flashlight.

9. The charging device of claim 8, wherein
the fourth LED, the fifth LED and the sixth LED of the load circuit can light to indicate that the electric power of the alkaline battery is exhausted;
the fourth LED, the fifth LED and the sixth LED of the load circuit can blink or extinguish to indicate that the alkaline battery fails.

10. The charging device of claim 2, wherein the charging device further comprises a charging selection circuit electrically connected between the steady-state voltage circuit and the pulse charging circuit.

11. The charging device of claim 10, wherein the
the charging selection circuit includes a charging selection switch and a chargeable battery;
the charging selection switch has a first terminal connected with the steady-state voltage circuit and a second terminal selectively connected with the chargeable battery or the alkaline battery so that the chargeable battery or the alkaline battery is selected to be charged by operation of the charging selection switch;
the steady-state voltage circuit is used to keep the voltage at a steady state to protect the chargeable battery or the alkaline battery to prevent the chargeable battery or the alkaline battery from producing overcharge.

* * * * *